United States Patent [19]

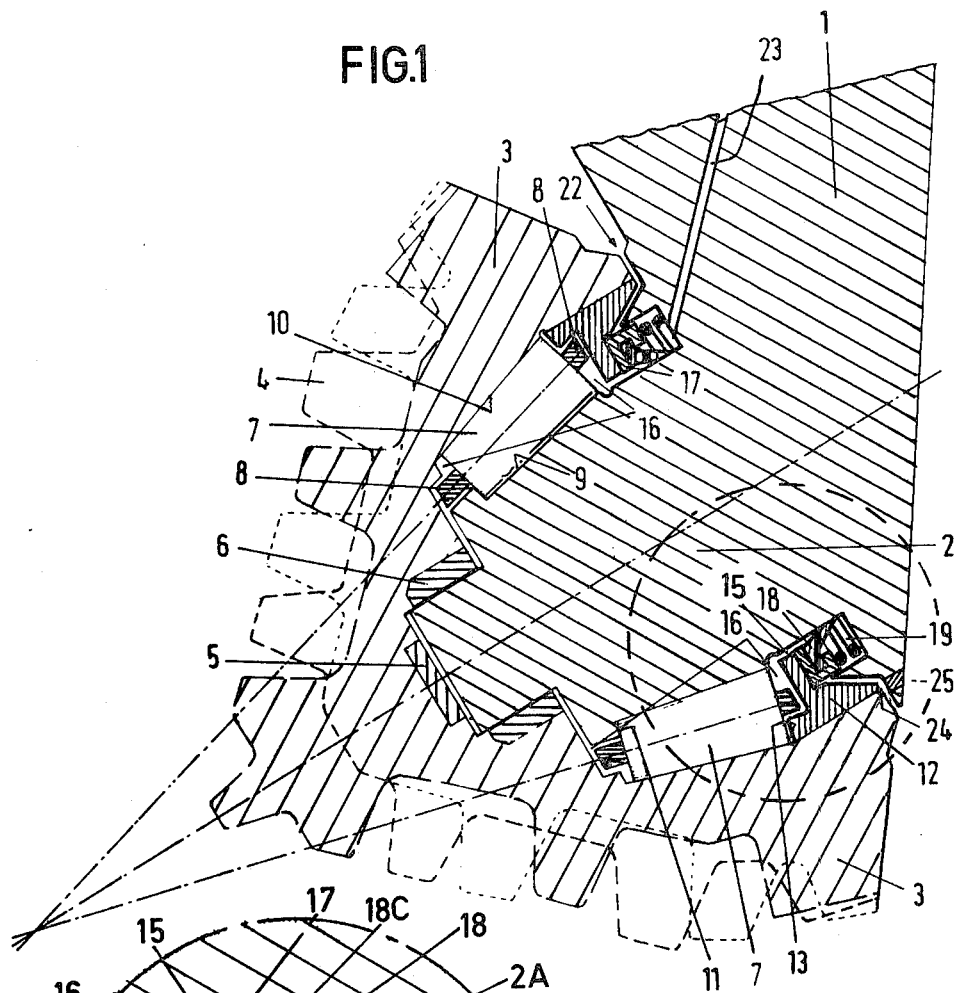
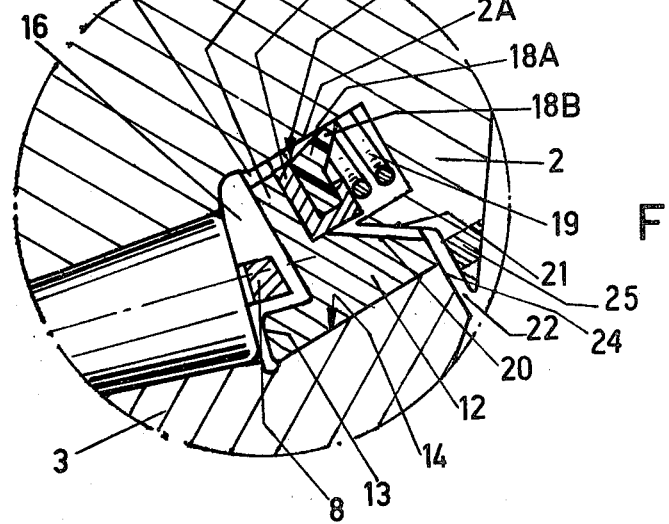

van Nederveen

[11] 4,172,502

[45] Oct. 30, 1979

[54] ROLLER BIT

[75] Inventor: Hans B. van Nederveen, Zeist, Netherlands

[73] Assignee: SKF Industrial Trading & Development Company B.V., Jutphaas, Netherlands

[21] Appl. No.: 824,926

[22] Filed: Aug. 15, 1977

[30] Foreign Application Priority Data

Aug. 23, 1976 [NL] Netherlands ............... 7609328

[51] Int. Cl.$^2$ ................... E21B 9/10; E21C 13/02
[52] U.S. Cl. .................... 175/369; 175/337; 175/372; 277/85; 308/8.2
[58] Field of Search ........... 175/227, 337, 369–372, 175/375; 308/8.2; 277/81, 81 R, 85

[56] References Cited

U.S. PATENT DOCUMENTS

| 3,707,315 | 12/1972 | Goodfellow | 308/8.2 |
| 3,907,191 | 9/1975 | Lichte | 175/375 X |
| 3,921,735 | 11/1975 | Dysart | 175/337 |

FOREIGN PATENT DOCUMENTS 1906309  9/1969  Fed. Rep. of Germany ............ 277/85

Primary Examiner—Ernest R. Purser
Assistant Examiner—Nick A. Nichols, Jr.
Attorney, Agent, or Firm—Eugene E. Renz, Jr.

[57] ABSTRACT

A roller bit for rock drilling comprising a body having at least one stub axle and a geared cutting element rotatably mounted on said stub axle. The stub axle and cutting element have confronting spaced raceways for a plurality of rolling elements. A shoulder is formed adjacent one end of the raceway in the stub axle to axially fix the rolling elements in one direction. A locking ring is mounted in the cutting element having an abutment shoulder confronting the opposite axial end faces of the rolling elements and axially fixing the rolling elements in a direction in the opposite direction. The locking ring has an outer cylindrical peripheral surface engaging in a complementary cavity in the cutting element adjacent the raceway surface therein. The locking ring has a seat for mounting a resilient sealing member engaging the stub axle adjacent the raceway therein connected in the mounted state to the stub axle.

8 Claims, 2 Drawing Figures

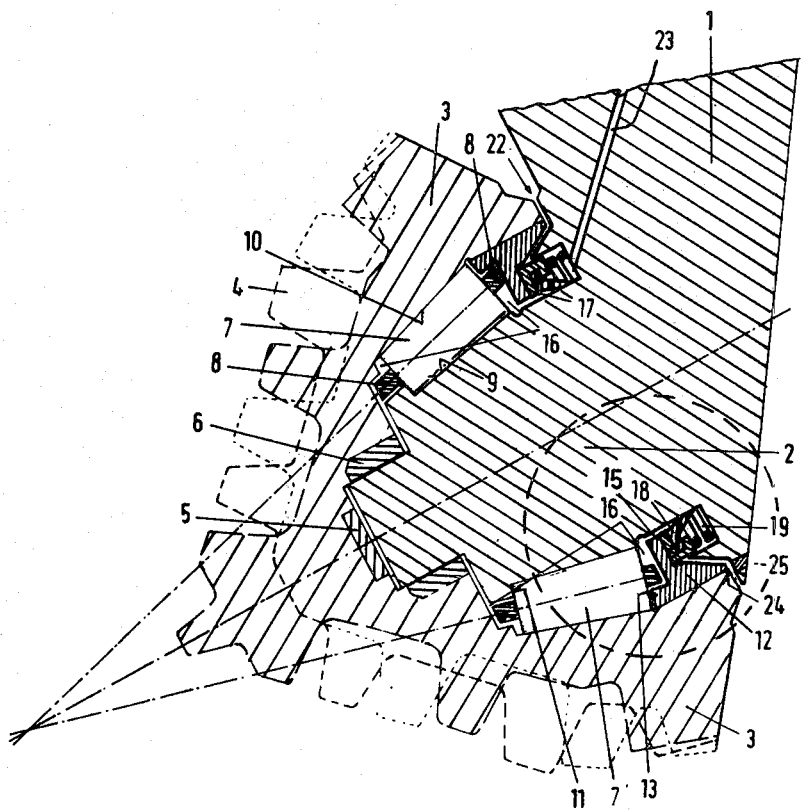

ROLLER BIT

BACKGROUND OF THE INVENTION

The invention relates to a roller bit for rock drilling. In rock drilling, for example for the recovery of petroleum, use is made of roller bits with a bit body which is provided on its upper face with means for coupling to a system of hollow, rotatable tubes, the "drilling string", and on its lower face with a number—often three—of stub axles, with geared cutting elements mounted so as to be freely rotatable about said stub axles, the roller bit being provided between the cutting elements with nozzles which communicate with the axial passage in the drilling string to allow supply of mud.

During operation the roller bit rests with a chosen pressure on the bottom of the borehole and is rotated so that the cutting elements roll over the bottom of the borehole and crush the rock. The mud supplied along the central passage of the drilling string gushes out of the nozzles against the bottom of the borehole so that the debris set free by the drilling head is washed away and taken along in the return stream of mud ascending through the annular space between the drilling string and the borehole wall.

The demands made on the bearings of the cutting elements on their respective stub axles are high, as is clear from the above description of the working of the roller bit. The preferred bearings are those of the "line contact" type, that is cylindrical or taper roller bearings, but so far the use of these has been limited to cylindrical or taper roller bearings of relatively restricted dimensions, so that several of them have been considered necessary for each cutting element. The reason for this is that so far no satisfactory solution for the axial locking and thus the axial load transmission in cylindrical or taper roller bearings in cutting elements of the type in question has been found.

SUMMARY OF THE INVENTION

The invention provides an axially loadable locking ring for a cylindrical or taper roller bearing of a rock or roller bit which can be of robust construction and can be easily fixed into the cutting element, so that a heavier cylindrical or taper roller bearing can be used than has been possible hitherto, and one row of cylinders or taper rollers per cutting element can suffice.

Since there is no difference in principle in the present case between cylindrical and taper roller bearings as far as their function as bearings are concerned, the following description will for convenience refer to a taper roller bearing.

The invention also envisages a locking ring for a rolling, i.e. ball or roller bearing with a configuration which ensures effective sealing of the bearing system against penetration of drilling debris.

To this end, in accordance with the invention, the locking ring, which has a cylindrical surface, can be axially inserted into and fixed in a complementary cavity communicating with a race formed in the body of the tip, the said race being provided on the side which in the mounted state faces the bearing with a shoulder which axially locks the bearing elements and on the other end with a seating for a sprung washer which in the mounted state is connected with the stub axle.

Because of the cylindrical construction of the outer surface of the locking ring of the invention it is possible to locate first the locking ring and the rolling elements on the stub axle and then to push the cutting element axially onto the stub axle, the locking ring being finally received into the cylindrical cavity designed for it in the cutting element.

During operation of the roller bit the sprung washer ensures optimum sealing of the bearing against penetration of drilling mud and against passage of lubricant contained in a reservoir which via a further embodiment of the invention can be formed in the locking ring in communication with the shoulder.

To improve the sealing against penetration of drilling debris provided by the washer, in a preferred embodiment of the invention the seating chamber formed in the locking ring for the washer may communicate via one or more channels recessed in the body of the bit with the central supply channel of the drilling string and the locking ring, connected to the seating, can be provided with a wall section whose shape is complementary to that of a wall section of the stub axle on which the cutting element is mounted, which in the mounted state is spaced apart from it. Between the facing wall sections of the locking ring and the stub axle there is therefore an annular slit wherein during operation an outward flow of mud is automatically maintained by the mud supplied to the radially inner end of the annular slit being diverted directly off the main stream while at the radially outer end of the annular slit the pressure of the ascending stream of mud which is throttled in the nozzles in the drilling head prevails. This effectively prevents particles of debris from this return stream from reaching the washer, still less the roller bearing.

The locking ring may be simply joined to the body of the bit by known welding methods. "Electron beam" welding is, however, efficient, and for this it is only necessary for the joint with the body of the bit to be accessible from one place along the circumference of the ring. At this place welding can be carried out while the cutting element rotates.

BRIEF DESCRIPTION OF THE DRAWING

These and other objects of the present invention and various features and details of the operation and construction thereof are hereinafter more fully set forth with reference to the accompanying drawing, wherein:

FIG. 1 is a fragmentary sectional view of one of the cutting elements of a roller bit; and FIG. 2 is an enlarged view of the portion of the roller but encircled in broken lines in FIG. 1.

DESCRIPTION OF A PREFERRED EMBODIMENT

Referring now to the drawing and particularly to FIG. 1 thereof there is shown one of the cutting elements of a rolling bit. These roller bits usually comprise a body 1 mounting a plurality of stub axles 2 and a cutting element 3 with teeth 4 rotatably supported on each of the stub axles. The cutting elements are supported on the stub axle by bearings including in the present instance a thrust bearing 5, a sleeve-type plain bearing 6 and a series of circumferentially spaced tapered rolling elements 7 of relatively heavy construction. A cage 8 may be provided to circumferentially space the rolling elements in a conventional manner. The inner race 9 for the rolling elements 7 is formed integrally in the stub axle 2 and the outer race is formed on the interior wall of the cutting element 3.

The rolling elements 7 are mounted in a manner to withstand axial loads incurred during operation of the cutting elements and to this end the stub axle is formed with a circumferentially extending undercut at its forward end defining a radial stop surface 11. The front axial end face of the rolling elements 7 abut the stop surface 11. A locking ring having a circumferential abutment shoulder 13 confronts the opposite axial end face of the rolling elements and limits axial displacement of the rolling elements. The locking ring also has a cylindrical outer peripheral surface which seats in a cylindrical cavity 14 formed in the cutting element 3 which merges at its inner end with the angled outer race 10 for the rolling elements 7. The locking ring is of a generally inverted T-shaped configuration or cross section to define a recess 16 confronting the outer axial end face of the rolling element 7. The recess 16 forms a reservoir for a lubricant for the rolling elements and also provides a space for the cage 8. In order to seal the lubricant reservoir 16 and elements against drilling mud and drilling debris surrounding the roller bit, the locking ring is provided with a seat 17 for a seal 18 which is pressed against the seat of the locking ring by means of a spring 19.

As illustrated in FIG. 2, the locking ring is provided with a biased or slanted wall portion 20 generally parallel to a wall portion of the stub axle 2 which in the assembled relation is spaced therefrom to provide an annular slit 22 facilitating a constant radially outward stream of the mud during operation. To this end at least one channel 23 is formed in the roller bit body 1 which as illustrated in FIG. 1 terminates at its inner end with the space in which the seal 18 is located and at its opposite end communicates with the mud supply channel (not shown) in the drilling string to which the roller bit is attached. In this manner part of the stream of mud in the drilling stream which is led through the bit and leaves the bit under and between cutting elements 3 via nozzles is diverted and led outwardly through annular slit 22 by a channel 23. By diverting part of the stream before the mud has reached the nozzles, the pressure of this partial stream is higher than that of the mud surrounding cutting element 3. The flow of mud in annular slit 22 is thus always directed radially outwardly and prevents penetration of drilling debris via this annular slit.

As best illustrated in FIG. 2, the seal 18 has a flexible annular body 18A with a sealing lip 18B which engages cylindrical wall 2A of the stub axle and is maintained in pressure applying relation with the aid of resilient means such as the spring 19. The annular body 18A of the seal is supported in a ring 18C of generally J-shaped cross section, spring 19 pressing against the short leg of the ring 18C while the long leg presses against the seat 17 of the locking ring 12. This seal effectively prevents both penetration of drilling debris into the bearing via the annular slit or aperture 22 and leakage of lubricant from the lubricant chamber 16.

The locking ring 12 is mounted in the cylindrical cavity 14 in cutting element 3 in a predetermined manner, for example by electron beamed welding. In order to apply a circumferential weld 24 to the joint between the cylindrical seat or surface 14 and locking ring 12, an aperture 25 may be provided in the stub axle adjacent that juncture. In this manner the access is provided to weld through the aperture 25. A circumferential weld is now applied simply by rotating the cutting element 3 with respect to the stub axle 2 during welding so that the circumference of locking ring 12 can be brought successively under aperture 25 and the circumferential weld 24 can be achieved. After welding the aperture 25 can be sealed.

The arrangement and configuration of the locking ring provides certain advantages in assemblies of the above type. For example, by reason of the cylindrical outer peripheral surface of the locking ring and the complementary pocket in the cutting element, it is possible first to locate the locking ring and the rolling elements on the stub axle and then to push the cutting element axially onto the stub axle, the locking ring being received into the cylindrical cavity designed for it in the cutting element. The parts are then locked in assembled relation simply by welding for example as at 24. The configuration of the locking ring also defines a lubricant chamber sealed from the outside environment by a seal supported on a seat on the locking ring and also providing a space for a cage.

I claim:

1. A roller bit for rock drilling comprising a body having at least one stub axle and a geared cutting element rotatably mounted on said stub axle, said stub axle and cutting element having confronting spaced raceways for a plurality of rolling elements, means defining a shoulder adjacent one end of the raceway in the stub axle axially fixing the rolling elements in one direction, a locking ring secured to the cutting element having an abutment shoulder confronting the opposite axial end faces of the rolling elements axially fixing the rolling elements in a direction opposite said one direction, said locking ring having an outer cylindrical peripheral surface engaging in a complementary cavity in the cutting element adjacent said raceway surface therein, said locking ring having a seat for mounting a resilient sealing member engaging the stub axle adjacent the raceway therein connected in the mounted state to said stub axle.

2. A roller bit as claimed in claim 1 wherein said locking ring is of generally T-shaped cross section having a portion spaced axially more distant from the opposite axial end faces of the rolling elements than said abutment shoulder to thereby define the recess forming a lubricant reservoir.

3. A roller bit as claimed in claim 1 including at least one channel formed in said body communicating with a mud supply channel extending the length of the drilling string and also with a chamber in said cutting element outboard of said resilient sealing element.

4. A roller bit as claimed in claim 1 wherein said locking ring has a wall portion angularly disposed to its outer peripheral surface which complements a wall portion of the stub axle and in the mounted state is spaced therefrom to define a peripheral channel.

5. A roller bit as claimed in claim 1 wherein said locking ring is securely fixed to said cutting element by welding.

6. A roller bit as claimed in claim 5 including at least one aperture in the stub axle providing external access to the joint between said locking ring and said cavity in the cutting element whereby upon continuous rotation of the cutting element, the entire circumference of the locking ring may be welded to said cutting element through said aperture.

7. A roller bit as claimed in claim 1 wherein said seal means includes a rigid member of J-shaped configuration supported in the seat of the locking ring and the flexible seal is supported in said J-shaped support member.

8. A roller bit as claimed in claim 7 wherein the flexible resilient member is provided with a sealing lip which engages under pressure an internal wall of the stub axle.

* * * * *